United States Patent Office 3,379,742
Patented Apr. 23, 1968

3,379,742
PROCESS FOR PREPARING TRANSFORMED
1:1 COMPLEX OF 1,6 - DIAMINOPYRENE-
p-CHLORANIL
Yoshio Matsunaga, Stamford, Conn., assignor to American Cyanamid Company, Stamford, Conn., a corporation of Maine
No Drawing. Filed June 18, 1965, Ser. No. 465,192
4 Claims. (Cl. 260—396)

The present invention relates to a novel semiconducting complex and to a process for preparing the same. More particularly, it relates to a process for preparing from a high resistivity semiconducting-organic molecular complex, a correspondingly low resistivity molecular comlex utilizing an inert aromatic solvent. In summary, the invention is concerned with a process for preparing a low resistance, semiconducting-organic molecular complex derived from high resistivity 1,6-diaminopyrene-p-chloranil semiconducting-organic molecular complex of the structure:

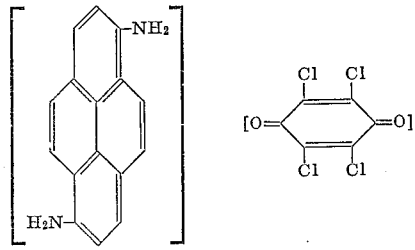

by wetting the latter with a suitable aromatic solvent and applying positive pressure thereto to effect a transformation into a new polymorphic form having a resistivity of not more than about 10 ohm-centimeter.

The molecular complex prepared by the process of the present invention possesses the enhanced property of low resistance, finding particular utility in solid state semiconductor devices exemplified by transistors, rectifiers, diodes, photocells, thermocouples and radiation detectors.

As is known, the molecular complex of 1,6-diamino-pyrene-p-chloranil can be readily prepared by reacting one or more moles of 1,6-diaminopyrene with one or more moles of p-chloranil in the presence of a hot inert solvent, such as benzene, toluene or chloroform. Upon cooling the reaction medium, crystals of a semiconducting 1:1 complex of 1,6-diaminopyrene-p-chloranil are obtained. This crystalline complex when compacted exhibits a resistivity of at least about $10^3$ ohm-cm.

To the present, there is a paucity of organic semiconductive materials of simple molecular structures exhibiting desirable low resistivities of less than about 10 ohm-cm. To provide the art with a procedure for preparing an organic semiconductive material which is relatively simple in molecular configuration and of low resistivity would satisfy an over constant growing need.

It is, therefore, a principal object of the invention to provide a straightforward and economical process for preparing a molecular complex which can be characterized as having a relatively simple molecular structure, i.e., 1,6-diaminopyrene-p-chloranil, possessing a low resistivity of not more than 10 ohm-cm. This and other objects will become apparent from a consideration of the ensuing detailed description.

According to the present invention, a process for preparing a novel molecular complex is provided, which complex is characterized by the formula:

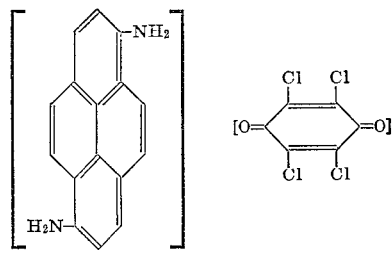

This process involves initially the mixing in varying molar amounts of the components comprising each of the moieties of the above-defined complex in a hot aromatic environment, such as benzene, cooling the reaction medium, filtering resultant crystals, drying the crystals, preferably by air, and recovering a complex having a resistivity equal to at least $10^3$ ohm-cm. The complex is then wetted with an aromatic solvent and compressed. There is recovered a complex having (1) a resistivity between 1 and 10 ohm-cm. and (2) a carbonyl band of 1640 $cm.^{-1}$ as detected by infrared spectral analysis.

In general, the aromatic solvent employed for wetting the complex prior to compression is illustratively: benzene, toluene, xylene, monochlorobenzene, dichlorobenzene, nitrobenzene, dimethylaniline and pyridine, benzene being the preferred solvent. The amount of solvent employed is merely sufficient to wet or otherwise cover the complex as a final operation prior to compression. Compression involves the use of sufficient pressures, usually from about 2000 to about 10,000 pounds per square inch for from about one minute to about twenty-four hours so as to effect the transformation of a high resistivity complex to a low resistivity complex of not more than 10 ohm-cm. Any pressure equipment, such as an automatic or hand press, can be employed to effect compression of the complex.

In determining the resistivity of the complex of the present invention a four probe method is employed. Compressed complex having a ⅜" diameter is mounted on a resistivity test device (Model B manufactured by A & M Fell, Ltd., England) and the resistivity is read directly using a Keithly (Model 502) milliohm-meter.

Advantageously, the electrical resistivity of the complex prepared above, measured at room temperature, does not exceed 10 ohm-cm. Substantially no increase in the resistivity even several months after preparation is observed.

The following examples are presented merely by way of illustration and are not to be deemed limitative of the present invention.

Example 1

To a suitable reaction vessel are added 2.32 grams (10 moles) of 1,6-diaminopyrene dissolved in 1.2 liters of hot benzene maintained at about 75° C. and 3.68 grams (15 moles) of p-chloranil in 370 ml. of hot benzene maintained at about 75° C. After standing overnight at room temperature, a brown crystalline complex is filtered and air dried. A yield of 4.5 grams is obtained. A portion (0.5 gram) is next compressed. The resistivity of the compressed complex measured at room temperature is about $1 \times 10^3$ ohm-cm. On analysis, the following is observed:

Calcd. for $(C_{16}H_{12}N_2)(C_6Cl_4O_2)$: C, 55.3%; H, 2.5%; N, 5.9%; Cl, 29.7%. Found: C, 55.2%; H, 2.4%; N, 6.1%; Cl, 29.4%.

The complex is subjected to infrared analysis. A characteristic carbonyl (C=O) peak is observed at 1690 cm.$^{-1}$.

Similar resistivity results are obtained when employing equimoles of 1,6-diaminopyrene and p-chloranil.

Example 2

A portion (0.5 gram) of the dried complex prepared in Example 1 above is wetted with about 0.1 ml. benzene and compressed into a thin wafer by means of a hand press. It is held in the press for about five minutes at a pressure approximating 2000 pounds per square inch. The resistivity of the so-compressed complex is lowered to about 5 ohm-cm. within about twenty-four hours and, upon analysis, the following is recorded:

Calcd. for $(C_{16}H_{12}N_2)_1(C_6Cl_4O_2)_1$: C, 55.3%; H, 2.5%; N, 5.9%; Cl, 29.7%. Found: C, 55.8%; H, 2.7%; N, 5.7%; Cl, 29.6%.

Anaylsis by infrared spectra further indicates that the carbonyl or C=O group is 1640 cm.$^{-1}$ which evidences that a transformation into a new polymorphic form of the dried complex has occurred.

Similar results are obtained when the complex is wetted with toluene, xylene, nitrobenzene, dimethylaniline and pyridine.

Example 3

Repeating the procedure of Example 1 in every detail except that p-bromanil is substituted for p-chloranil, the resistivity of the compressed complex is about $1 \times 10^3$ ohm-cm. and, on analysis, the following is observed:

Calcd. for $(C_{16}H_{12}N_2)(C_6Br_4O_2)$: C, 40.3%; H, 1.8%; N, 4.3%; Br, 48.8%. Found: C, 40.3%; H, 1.9%; N, 4.4%; Br, 48.1%.

Characteristic strong peaks of the complex subjected to infrared spectral analysis is noted at 1670 cm.$^{-1}$, 1610 cm.$^{-1}$ and 1540 cm.$^{-1}$.

Example 4

In this example, the bromanil complex of Example 3 is wetted with benzene and compressed following the procedure of Example 2 in every other respect.

It is found that the resultant complex remains substantially unchanged with respect to resistivity and spectral analysis at $10^3$ ohm-cm. and 1670 cm.$^{-1}$, 1610 cm.$^{-1}$ and 1540 cm.$^{-1}$, respectively.

I claim:

1. An improved method for preparing an organic (1:1) molecular complex which comprises: admixing in an inert aromatic solvent 1 mole of 1,6-diaminopyrene and from 0.3 to 3 moles of p-chloranil to recover a high resistivity complex, thereafter wetting the complex with an aromatic organic menstruum selected from the class consisting of benzene, toluene, xylene, nitrobenzene, dimethylaniline and pyridine, compressing said wetted complex, and recovering a low resistivity complex.

2. The process according to claim 1 in which the menstruum is benzene.

3. A process for preparing an organic (1:1) molecular complex 1,6-diaminopyrene-p-chloranil possessing a resistivity of less than about 10 ohm-cm. and a carbonyl infrared spectral peak of 1640 cm.$^{-1}$, which comprises the steps of: subjecting to the wetting action of an aromatic organic menstruum selected from the class consisting of benzene, toluene, xylene, nitrobenzene, dimethylaniline and pyridine an air-dried complex of the formula:

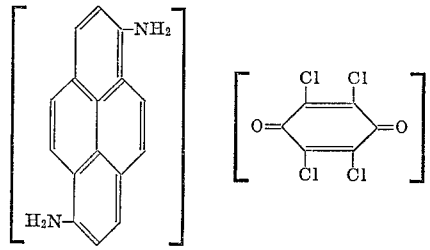

said complex having a resistivity of at least about $1 \times 10^3$ ohm-cm. and a carbonyl infrared spectral peak of 1690 cm.$^{-1}$; compressing the latter complex while so-wetted for from about one minute to about twenty-four hours to effect transformation of the so-treated complex whereby the latter which has the formula:

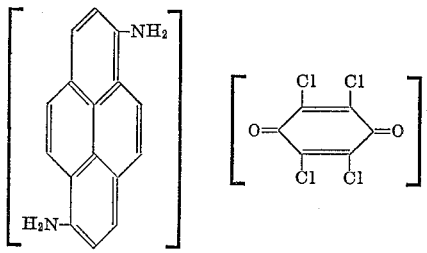

possesses a resistivity of from about 1 to 10 ohm-cm. and a carbonyl infrared spectral peak of 1640 cm.$^{-1}$ and recovering the latter complex.

4. A process according to claim 3 in which the organic menstruum is benzene.

References Cited

The Journal of Chemical Physics (vol. 33), No. 3, September 1960, Labes et al.

LORRAINE A. WEINBERGER, *Primary Examiner.*

L. A. THAXTON, *Assistant Examiner.*